US006950643B1

(12) United States Patent
Menkhoff et al.

(10) Patent No.: US 6,950,643 B1
(45) Date of Patent: Sep. 27, 2005

(54) DIGITAL FILTER COMBINATION

(75) Inventors: Andreas Menkhoff, Oberhaching (DE); Peter Schoellhorn, Holzkirchen (DE)

(73) Assignee: Infineon Technologies AG, Munich (DE)

( * ) Notice: Subject to any disclaimer, the term of this patent is extended or adjusted under 35 U.S.C. 154(b) by 348 days.

(21) Appl. No.: 10/110,421

(22) PCT Filed: Oct. 11, 2000

(86) PCT No.: PCT/EP00/10015

§ 371 (c)(1), (2), (4) Date: Aug. 27, 2002

(87) PCT Pub. No.: WO01/28091

PCT Pub. Date: Apr. 19, 2001

(30) Foreign Application Priority Data

Oct. 11, 1999 (DE) ................................ 199 48 893

(51) Int. Cl.[7] ................................................ H04B 1/10

(52) U.S. Cl. ...................... 455/307; 455/288; 708/313; 375/350

(58) Field of Search .............................. 455/3.02, 286, 455/288, 307, 289, 290; 375/350, 346; 708/313

(56) References Cited

U.S. PATENT DOCUMENTS

| | | | | |
|---|---|---|---|---|
| 5,325,318 A * | 6/1994 | Harris et al. | ................ | 708/313 |
| 5,953,636 A | 9/1999 | Keate et al. | ................. | 455/3.2 |
| 5,955,783 A | 9/1999 | Ben-Efraim et al. | ........ | 257/728 |
| 6,134,282 A * | 10/2000 | Ben-Efraim et al. | ........ | 375/350 |
| 6,631,256 B2 * | 10/2003 | Suominen | ................... | 455/302 |

FOREIGN PATENT DOCUMENTS

EP EP 07165184 A2 6/1996 ............ H04H 1/00

OTHER PUBLICATIONS

Oppenheim und Schafer., "Zeitdiskrete Signalverarbeitung," R. Oldenbourg Verlag, Munich, Vienna 1999, pp. 121-152.
PCT International Search Report, Feb. 23, 2001, EPO.
Gevargiz, et al., "Analysis of Digital Matched Filtering Schemes for Digital Receiver Applications Using Simulation Methods," Proceedings of the Global Telecommunications Conference, New York, Dec. 1991, pp. 1556-1563.
German Office Action, May 31, 2000.

* cited by examiner

*Primary Examiner*—Edward F. Urban
*Assistant Examiner*—Blane J. Jackson
(74) *Attorney, Agent, or Firm*—Fish & Richardson P.C.

(57) ABSTRACT

The invention features a filter arrangement for filtering an input signal that includes a transmitter signal having a predetermined pulse shape at a receiving end to transmit the input signal, a decimation filter to decimate the input signal that includes a passband frequency range and a wide transition frequency range with an amplitude attenuation, and a matching filter to match the input signal to the pulse shape of the transmitter signal. Such filter arrangements also feature passband frequency ranges for decimation filters which are smaller than the ranges for matching filters.

4 Claims, 1 Drawing Sheet

DIGITAL FILTER COMBINATION

Figure 1:
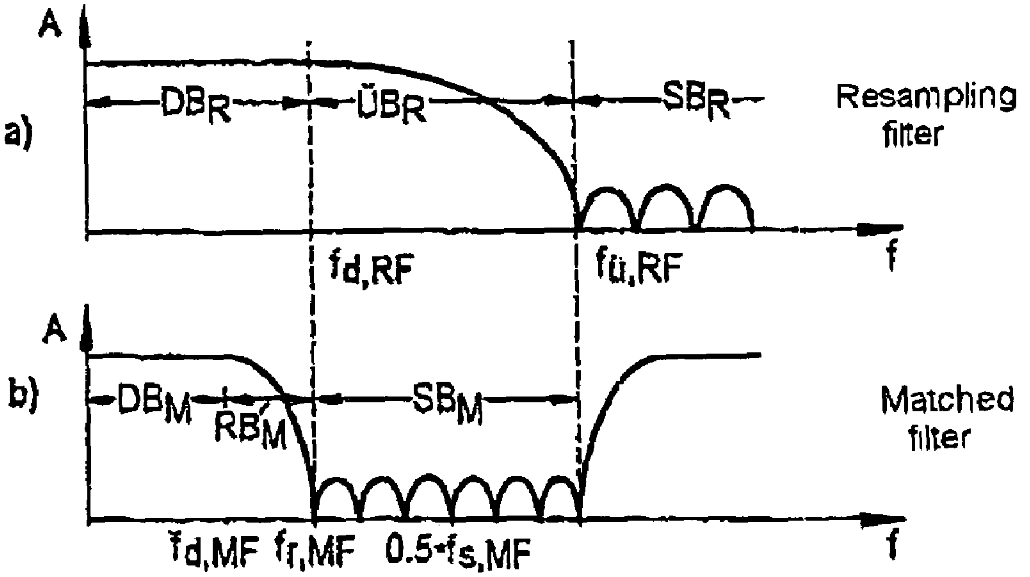

The invention relates to an arrangement having two digital filters for filtering an input signal derived from a transmitter signal with a predetermined pulse shape at the receiving end.

Such a digital filter combination is used for example in reception systems for DVB (digital video broadcast). In reception systems which have digital filter combinations, the analog reception signal is digitized by means of an analog/digital converter. Digital filters operate with samples rather than continuous values. The limited bandwidth of the digital filters means that disturbances arise, which are referred to as aliasing. In order that the effects of the aliasing error of the digital filters are kept; small, an analog anti-aliasing filter is connected upstream of the analog/digital converter. The requirements made of the analog anti-aliasing filter are less stringent, the higher the frequency with which the analog/digital converter is clocked.

The digitized reception signal is processed by the digital filter combination. The latter performs a number of tasks:

1.) Owing to the oversampling of the analog reception signal with regard to the symbol frequency by the analog/digital converter, the filter combination must decimate the frequency of the digital reception signal to the symbol frequency. In this case, the decimation factor is generally a real number.

2.) The data clock signal implicitly contained in the analog reception signal must generally be recovered at the receiving end. For this clock recovery, it is necessary to calculate interpolation values between the given samples. Therefore, the filter combination must also be designed for interpolation.

3.) The filter combination must ensure optimum matching of the reception signal to the pulse shape of the signal of the transmitter. In: "Nachrichtenübertragung" [Information transmission] by K. D. Kammeyer, 2nd edition, Teubner, 1996, page 168, such a filter is referred to as a matched filter.

According to Crochiere: Multirate digital signal processing, Prentice-Hall, 1983, chapter 5.3, the least complex realization of a filter combination for decimation by a relatively large factor consists in splitting the filter combination into a plurality of subfilters. Ideally, each subfilter carries out a decimation by the factor 2, since the transition range then becomes maximal between passband and stop band. In the passband of a filter, the attenuation is 0 or approximately 0. In real filters, the stop band does not follow the passband abruptly. Rather, the transition range lies between the passband and the stop band, the attenuation increasing continuously in said transition range.

The multistage decimation method proposed by Crochiere can be found in present-day receiver designs. The first subfilter serves for the clock recovery and decimation of the digital reception signal. It is usually referred to as resampling filter. The second subfilter serves for matching to the pulse shape of the transmitter signal and further decimation and, as specified above, is referred to as matched filter.

Since the two subfilters have separate tasks, they are also designed separately from one another. In many applications, the filter used at the transmitting end is a root-cosine filter. In order that the implementation loss of the receiver is kept small, it is also necessary to use a root-cosine filter as matched filter at the receiver end. These filters are described for example in Kammeyer, pages 166–171. These filters have the inherent property of the smooth amplitude response in the passband. By way of example, the dimensioning of such a matched filter has been described in Meyr, Moneclay, Fechtel: Digital Communication Receivers, J. Wiley, 1997, page 552. The simple eighth-order filter with five bit coefficients that is specified there has only a deviation of at most 0.07 dB relative to an ideally smooth amplitude response in the passband.

The resampling filter is usually designed in such a way that, in the passband of the matched filter, it has the smoothest possible amplitude profile without attenuation. What is thereby achieved is that the amplitude profile of the matched filter is influenced as little as possible. The attenuation of the resampling filter is maximal at the points at which the matched filter no longer has attenuation outside the passband.

Since resample filter and matched filter are designed separately, the complexity for the implementation is relatively high.

It is an object of the present invention to specify a filter arrangement for the decimation of the input clock to the symbol clock and for pulse shaping whose implementation complexity is less than in the case of conventional arrangements comprising resample and matched filters. At the same time, the intention is that the filtering quality shall not be reduced.

This object is achieved by means of a filtering arrangement having the features of patent claim 1.

The invention has the advantage that the complexity for the implementation of the digital filter combination is reduced. In accordance with Crochiere, page 208 et seq., the order of a filter with given attenuation is inversely proportional to the width of the transition between passband and stop band. This range is enlarged in the case of the filtering arrangement according to the invention, as a result of which it is possible to realize a given stop band attenuation with fewer filter coefficients. Compared with the filtering arrangement according to the invention, a conventional filter combination with resampling filter and matched filter with e.g. in each case decimation by the factor 2 of the input signal requires half as many filter coefficients again.

Since the decimation filter already has a greater attenuation in the stop band of the matching filter, less complexity for the realization of the stop band is required in the case of the matching filter. Consequently, the order of the matching filter can likewise be slightly reduced.

Since both the matching filter ard the decimation filter have a lower filtering order, the group delay of both filters is smaller. As a result, phase-locked loops (PLL) which contain, the filtering arrangement according to the invention are also faster and also exhibit less noise. This is of importance particularly in the case of circuits for clock recovery or carrier recovery.

Refinements of the invention are characterized in the subclaims.

Figure 2:
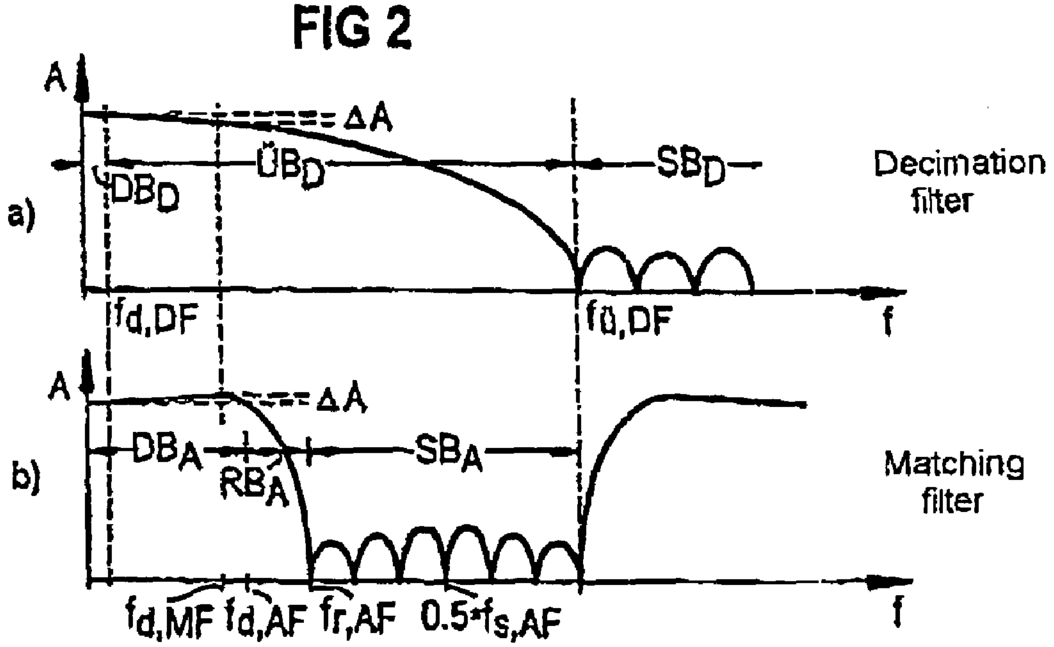

The invention is explained in more detail below with reference to figures, in which:

FIG. 1*a* shows an amplitude response of a resampling filter,

FIG. 1*b* shows an amplitude response of a matched filter,

FIG. 2*a* shows an amplitude response of a decimation filter of the filtering arrangement, and FIG. 2*b* shows an amplitude response of a matching filter of the filtering arrangement.

In a conventional filtering arrangement with a resampling filter and a matched filter, the two filters are designed separately. The matched filter is designed in such a way that an input signal received at the receiver end is matched as well as possible to a pulse shape of a transmitter signal. It carries out decimation of the input signal preferably by the factor 2. The resampling filter is designed in such a way that a passband and a roll-off range of the matched filter are influenced as little as possible by the cascading of the resampling filter with the matched filter. In the frequency range containing the passband and roll-off range of the matched filter, the amplitude response of the resampling filter is smooth. The gradient of the amplitude response of the resampling filter is practically 0 in this frequency range. An amplitude response of a filter combination comprising resampling filter and matched filter corresponds to the amplitude response of the matched filter within this range. In this range, the resampling filter has practically an attenuation of 0. In this case, practically is intended to mean that, in a real resampling filter, the attenuation is so large that it can be equated, with regard to the effect, to an attenuation of 0.

According to FIG. 1*b*, the amplitude response of the matched filter has a passband $DB_M$, a roll-off range $RB_M$ and a stop band $SB_M$. An amplitude A is plotted against a frequency f.

In the passband $DB_M$, the gradient of the amplitude response is equal to zero. The boundary between the passband $DB_M$ and the roll-off range $RB_M$ lies at a frequency $f_{d,MF}$, and the boundary between the roll-off range $RB_M$ and the stop band $SB_M$ lies at a frequency $f_{r,MF}$.

The frequency $f_{d,MF}$ can be calculated by means of: $f_{d,MF}=f_{sym}*(1-r)/2$, where $f_{sym}$ is a symbol frequency and r corresponds to a roll-off factor of the matched filter.

The matched filter operates at a sampling frequency $f_{s,MF}$.

According to FIG. 1*a*, the amplitude response of the resampling filter can likewise be divided into three ranges: a passband $DB_R$, a transition range $ÜB_R$ and a stop band $SB_R$. A frequency $f_{d,RF}$ represents a boundary between the passband $DB_R$ and the transition range $ÜB_R$ of the resampling filter. This frequency can be calculated as follows: $f_{d,RF}=f_{sym}*(1+r)/2$. Moreover, the following holds true; $f_{d,RF} \geqq ½(f_{d,MF}+f_{R,MF})=f_{sym}/2$.

A frequency $f_{ü,RF}$ represents the boundary between the transition range $ÜB_R$ and the stop band $SB_R$ of the resampling filter; it can be calculated as follows: $f_{ü,RF}=f_{s,MF}-f_{r,MF}$. $f_{r,MF}$ is equal to $f_{d,RF}$. The passband $DB_R$ is larger than the passband $DB_M$.

The stop band $DB_R$ of the resampling filter is designed in such a way that the stop band $DB_M$ and the roll-off range $RB_M$ of the matched filter are as far as possible not corrupted. Ideally, the amplitude response of the resampling filter therefore runs smoothly up to the frequency $f_{r,MF}$. Since the matched filter has a large attenuation in the vicinity of the frequency $f_{r,MF}$, in a real resampling filter the amplitude response can fall slightly in the passband $DB_R$ in the vicinity of the frequency $f_{r,MF}$.

In the filtering arrangement according to the invention, a decimation filter for the decimation of the input signal and a matching filter for matching the input signal to the pulse shape of the transmitter signal are provided. The decimation filter corresponds to the resampling filter. However, the decimation filter is not designed separately from the matching filter. Rather, the decimation filter is designed in such a way that, in combination with the matching filter, an amplitude response is produced as in the case of the matched filter of the conventional filter combination. The matching filter essentially differs from the matched filter in that, in a frequency range corresponding to the passband $DB_M$ of the matched filter, it does not have a smooth amplitude response, but rather a rising one. The decimation filter has a falling amplitude response in this frequency range. The combination of decimation filter with the matching filter produces a smooth amplitude response in this frequency range.

In accordance with FIG. 2*a*, the amplitude response of the decimation filter has a transition range $ÜB_D$ and a passband $DB_D$, which are separated by the frequency $f_{d,DF}$, and also a stop band $SB_D$.

The amplitude response runs smoothly within the passband $DB_D$. This means that the attenuation (with the exception of singular peaks on account of ripple or the like) is at most 0.07 dB there. Outside the passband $DB_D$, the attenuation is continuously greater than 0.07 dB. In the transition range $ÜB_D$, the transmissivity falls from a maximum value at the frequency $f_{d,DF}$ down to the value 0 at a frequency which is somewhat greater than $f_{ü,DF}$. $f_{ü,DF}$ is calculated as follows: $f_{ü,DF}=f_{s,AF}-f_{sym}-(1+r)/2$. The frequencies $f_{ü,DF}$ and $f_{ü,RF}$ are identical. The stop band $SB_D$ contains four zeros in the exemplary embodiment. The first zero follows directly after the frequency $f_{ü,DF}$.

In accordance with figure 2*b*, the amplitude response of the matching filter has a passband $DB_A$, a roll-off range $RB_A$ and a stop band $SB_A$. The passband $DB_A$ extends as far as a pass frequency $f_{d,AF}$ From the frequency $f_{d,DF}$ up to the pass frequency $f_{d,AF}$ the amplitude response rises by an amplitude boost ΔA. This boost ΔA is at least 1 dB, that is to say is significantly greater than the maximum attenuation in the passband $DB_D$. The amplitude response of the decimation filter falls by exactly this amplitude boost ΔA in the range of frequencies from $f_{d,DF}$ up to the frequency $f_{d,AF}$. The roll-off range $RB_A$ of the matching filter covers the frequencies from the pass frequency $f_{d,AF}$ up to a transition frequency $f_{r,AF}$, which, is greater than $f_{d,AF}$. In the roll-off range $RB_A$, the amplitude falls from a maximum value down to a value which is only somewhat greater than zero. The roll-off range $RB_A$ is followed by the stop band SBA with four zeros (in this exemplary embodiment).

According to the invention, the passband $DB_D$ in the decimation filter must always be smaller than the passband $DB_A$ of the matching filter.

What is claimed is:

1. A filter arrangement for filtering an input signal derived from a transmitter signal with a predetermined pulse shape at a receiving end, the filter arrangement comprising:
- a decimation filter to decimate the input signal, the decimation filter having a first passband frequency range and a wide transition frequency range with an amplitude attenuation; and
- a matching filter to match the input signal to the pulse shape of the transmitter signal; wherein
  - the first passband frequency range of the decimation filter is smaller than a second passband frequency range of the matching filter, and
  - the matching filter has an amplitude boost in a specific frequency range of the first passband frequency range for the compensation of the amplitude attenuation of the decimation filter within the first passband frequency range.

2. The filter arrangement of claim 1 wherein the amplitude boost of the matching filter in the specific frequency range is at least 1 dB (decibel).

3. The filter arrangement of claim 1 wherein the decimation filter has a passband frequency range of zero.

4. The filter arrangement of claim 1 wherein a frequency bandwidth of the decimation filter transmission frequency range following the passband frequency range is associated with a symbol frequency rate.

* * * * *